US011169165B2

(12) United States Patent
Wilson et al.

(10) Patent No.: US 11,169,165 B2
(45) Date of Patent: Nov. 9, 2021

(54) SAMPLE SUPPLY SYSTEM AND METHODS OF SUPPLYING SAMPLES

(71) Applicant: Laboratory Corporation of America Holdings, Burlington, NC (US)

(72) Inventors: David Wilson, Windsor, CT (US); Jay Krajewski, Windsor, CT (US); Kevin Meyer, Windsor, CT (US)

(73) Assignee: Laboratory Corporation of America Holdings, Burlington, NC (US)

( * ) Notice: Subject to any disclaimer, the term of this patent is extended or adjusted under 35 U.S.C. 154(b) by 285 days.

(21) Appl. No.: 16/263,932

(22) Filed: Jan. 31, 2019

(65) Prior Publication Data

US 2019/0234980 A1    Aug. 1, 2019

Related U.S. Application Data

(60) Provisional application No. 62/624,359, filed on Jan. 31, 2018, provisional application No. 62/624,450, (Continued)

(51) Int. Cl.
*G01N 35/00* (2006.01)
*G01N 35/04* (2006.01)
*B01L 9/06* (2006.01)

(52) U.S. Cl.
CPC ........... *G01N 35/0092* (2013.01); *B01L 9/06* (2013.01); *G01N 35/00732* (2013.01); *G01N 35/04* (2013.01); *B01L 2300/021* (2013.01); *B01L 2300/0609* (2013.01); *B01L 2300/0861* (2013.01); *B01L 2300/0864* (2013.01); (Continued)

(58) Field of Classification Search
CPC ......... G01N 35/0092; G01N 35/00732; G01N 35/04; G01N 2035/0472; G01N 2035/047; G01N 2035/0465; G01N 2035/0096; G01N 2035/0484; G01N 2035/0406; G01N 2035/00752; B01L 9/06; B01L 2300/0864; B01L 2300/0861; B01L 2300/021;
(Continued)

(56) References Cited

U.S. PATENT DOCUMENTS 6,220,451 B1    4/2001  Hoffmann
2002/0106305 A1*  8/2002  Willenbring ......... G01N 35/021
                                                              422/63
(Continued)

FOREIGN PATENT DOCUMENTS

DE    2519111    7/1976
DE    4301131    7/1994
(Continued)

OTHER PUBLICATIONS

PCT/US2019/016062, International Preliminary Report on Patentability, dated Aug. 13, 2020, 12 pages.
(Continued)

*Primary Examiner* — Jill A Warden
*Assistant Examiner* — John McGuirk
(74) *Attorney, Agent, or Firm* — Kilpatrick Townsend & Stockton LLP (57) ABSTRACT

Disclosed are high-throughput vessel supply systems and methods of supplying sample vessels, such as samples stored in test tubes. A system for supplying a plurality of individual vessels that each contains a sample is disclosed.

18 Claims, 6 Drawing Sheets

Related U.S. Application Data filed on Jan. 31, 2018, provisional application No. 62/624,486, filed on Jan. 31, 2018, provisional application No. 62/624,419, filed on Jan. 31, 2018, provisional application No. 62/624,530, filed on Jan. 31, 2018.

(52) U.S. Cl.
CPC ............... *G01N 2035/0096* (2013.01); *G01N 2035/00752* (2013.01); *G01N 2035/0406* (2013.01); *G01N 2035/047* (2013.01); *G01N 2035/0465* (2013.01); *G01N 2035/0472* (2013.01); *G01N 2035/0484* (2013.01)

(58) Field of Classification Search
CPC ........ B01L 2300/0609; B65G 47/1471; B65G 47/1414; B65G 47/1442
See application file for complete search history.

(56) References Cited

U.S. PATENT DOCUMENTS

| | | | |
|---|---|---|---|
| 2003/0047418 A1* | 3/2003 | Okada | B65G 47/1471 198/459.1 |
| 2010/0288056 A1 | 11/2010 | Clark et al. | |
| 2012/0171078 A1* | 7/2012 | Kaneko | B65G 47/1471 422/65 |
| 2013/0085597 A1 | 4/2013 | Koch et al. | |
| 2013/0123089 A1 | 5/2013 | Johns et al. | |
| 2014/0037517 A1 | 2/2014 | Takai | |
| 2014/0166685 A1* | 6/2014 | Petoe | G01N 35/04 221/1 |
| 2014/0318927 A1 | 10/2014 | Pedrazzini | |
| 2016/0229642 A1 | 8/2016 | Valles | |
| 2017/0152109 A1 | 6/2017 | Mizuki | |

FOREIGN PATENT DOCUMENTS

| | | | | |
|---|---|---|---|---|
| DE | 4301131 A1 | * | 7/1994 | ......... B65G 47/1471 |
| EP | 3128314 | | 2/2017 | |
| FR | 2957671 | | 9/2011 | |
| GB | 2342093 A | * | 4/2000 | ............... B65G 1/02 |
| JP | 2008268033 | | 11/2008 | |
| JP | 2011209045 | | 10/2011 | |
| WO | 2017/047240 | | 3/2017 | |

OTHER PUBLICATIONS

PCT/US2019/016062, International Search Report and Written Opinion, dated May 6, 2019, 15 pages.
PCT/US2019/016059, International Preliminary Report on Patentability, dated Aug. 13, 2020, 12 pages.
PCT/US2019/016059, International Search Report and Written Opinion, dated May 3, 2019, 16 pages.
PCT/US2019/016067, International Preliminary Report on Patentability, dated Aug. 13, 2020, 9 pages.
PCT/US2019/016067, International Search Report and Written Opinion, dated May 3, 2019, 14 pages.

* cited by examiner

SAMPLE SUPPLY SYSTEM AND METHODS OF SUPPLYING SAMPLES

PRIORITY

The present application claims priority to U.S. Provisional Patent Application No. 62/624,359, filed Jan. 31, 2018, U.S. Provisional Patent Application No. 62/624,450, filed Jan. 31, 2018, U.S. Provisional Patent Application No. 62/624,486, filed Jan. 31, 2018, U.S. Provisional Patent Application No. 62/624,419, filed Jan. 31, 2018, and U.S. Provisional Patent Application No. 62/624,530, filed Jan. 31, 2018, all of which are hereby incorporated by reference in their entireties herein.

FIELD

Described herein are systems for supplying a plurality of sample vessels e.g., for downstream sorting and/or analysis and methods of supplying such a plurality of sample vessels.

BACKGROUND

Many conventional systems do not have the capability to reorient a plurality of vessels from a random arrangement into an organized arrangement for further characterization of the vessels or samples therein. Similarly, conventional systems do not have the capability to feed individual vessels selected from a plurality of vessels to a large downstream process and to do so at a constant rate with high throughput. For processes downstream, a constant and reliable feed stream may improve operational efficiency. There remains a need for sample vessel supply systems capable of consistently supplying a large number of sample vessels into a downstream process individually and with the vessel orientation aligned with the requirements of the downstream processes. Described herein are new systems and methods to efficiently supply a large volume of sample vessels into various downstream processes such that the vessels are presented and sorted individually and at a high rate of speed.

SUMMARY

Described herein are systems and methods to supply a plurality of vessels, such as sample vessels and test tubes, into a downstream system or process at a high rate of speed with minimal human interaction. The invention may be embodied in a variety of ways.

In some embodiments, a system for supplying a plurality of vessels may comprise: a feeding unit configured to supply a plurality of vessels to at least one exit position, where each of the plurality of vessels is configured to hold a sample. The feeding unit may comprise: a feed bin; a transporter configured to remove individual vessels from the feed bin; and a transfer belt configured to transfer the vessels to an exit position of the feeding unit. In certain embodiments, the feed bin may be substantially trapezoidal in shape and comprise a bottom surface, a substantially open top, a front, a back, an A-side and a B-side, where the A-sides and B-sides are opposite to each other. The feed bin may be configured to feed each of the plurality of vessels from an entry position, e.g., at the top of the feed bin to at least one edge position, e.g., at or near a bottom surface of the bin. The feed bin may also include at least one transporter positioned in communication with vessels at the at least one edge position. For example, in one embodiment there may be at least one transporter on at least one of the A-side or the B-side of the feed bin. The transporter may be configured to receive each of the plurality of vessels from the at least one edge position and transport each of the vessels to at least one transfer point. The system may further comprise at least one transfer belt positioned at the exit of the at least one transporter and configured to receive each of the plurality of vessels from the at least one transfer point and individually transfer individual vessels from the at least one transfer point to an exit position within the system. In some embodiments, the transfer belt is positioned at or near the top of the bin. In some embodiments, a system for supplying a plurality of vessels may comprise: a feeding unit configured to supply a plurality of vessels to at least one exit position, where each of the plurality of vessels is configured to hold a sample, and where the feeding unit comprises: (i) a feed bin, the bin being substantially trapezoidal in shape and comprising a bottom surface, a substantially open top, a front, a back, an A-side and a B-side, and configured to feed each of the plurality of vessels from an entry position at the top of the feed bin to at least one edge position of the bottom surface; (ii) at least one transporter positioned on at least one of the A-side or the B-side of the feed bin and configured to receive each of the plurality of vessels from the at least one edge position and transport each of the vessels to the at least one transfer point; and (iii) at least one transfer belt positioned at the exit of the at least one transporter and at or near the top of the bin, and configured to receive each of the plurality of vessels from at least one transfer point and individually transfer individual vessels from the at least one transfer point to an exit position within the system.

The transporter unit may be configured to move individual vessels in a sequential manner. In some embodiments, the at least one transporter may comprise discrete sorting regions that are configured to hold vessels that are individually juxtaposed. For example, the sorting regions may align a number vessels in a linear fashion for further sorting and downline processing. For example, in some embodiments, the at least one transporter may comprise a series of steps configured to individually transfer vessels from one step to the next step in the series.

In some embodiments, the system may comprise two transporters and two transfer belts. For example, one transporter and transfer belt pair may be associated with the A-side of the feed bin and the other transporter and transfer belt pair may be associated with the B-side of the feed bin. In some embodiments, the system is modular in that multiple feeding units may be juxtaposed as part of a larger system for downstream analysis of the samples within the vessels.

Also disclosed herein are methods for supplying a plurality of vessels. The method may comprise: providing a plurality of vessels; transferring the plurality of vessels to a feeding unit where the feeding unit comprises a feed bin, a transporter configured to remove individual vessels from the feed bin; and a transfer belt configured to transfer the vessels to an exit position of the feeding unit. In some embodiments, the feed bin may be substantially trapezoidal in shape and comprise a bottom surface, a substantially open top, a front, a back, an A-side and a B-side, and may be configured to feed each of the plurality of vessels from an entry position at the top of the feed bin to at least one edge position at or near the bottom surface of the bin. Also in some embodiments, the at least one transporter may be positioned on at least one of the A-side or the B-side of the feed bin and configured to receive each of the plurality of vessels from the at least one edge position. In an embodiment, the transporter is used to transport each of the vessels to at least one transfer point. The method may also employ using at least one transfer belt positioned at the exit of the at least one transporter to receive each of the plurality of vessels from the at least one transfer point and individually transfer each individual vessel from the at least one transfer point to a bin exit position within the system. In an embodiment, the exit of the at least one transporter is at or near the top of the bin. The method may also transfer the vessel via the at least one transfer belt to a downstream process or unit. For example, a method for supplying a plurality of vessels, may comprise: providing a plurality of vessels; transferring the plurality of vessels to a feeding unit, the feeding unit configured to: supply a plurality of vessels to at least one exit position, where each of the plurality of vessels is configured to hold a sample, and where the feeding unit comprises: (i) a feed bin, the bin being substantially trapezoidal in shape and comprising a bottom surface, a substantially open top, a front, a back, an A-side and a B-side, and configured to feed each of the plurality of vessels from an entry position at the top of the feed bin to at least one edge position of the bottom surface; (ii) at least one transporter positioned on at least one of the A-side or the B-side of the feed bin and configured to receive each of the plurality of vessels from the at least one edge position and transport each of the vessels to the at least one transfer point; and (iii) at least one transfer belt positioned at the exit of the at least one transporter and at or near the top of the bin, and configured to receive each of the plurality of vessels from at least one transfer point and individually transfer each individual vessel from the at least one transfer point to a bin exit position within the system; and transferring the vessel via the at least one transfer belt to a downstream process or unit.

This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings and each claim. Further aspects, objects, and advantages of the invention will become apparent upon consideration of the detailed description and figures that follow.

BRIEF DESCRIPTION OF THE FIGURES

The present disclosure may be better understood with reference to the accompanying figures, in which embodiments of the invention are shown. This invention may, however, be embodied in many different forms and should not be construed as limited to the embodiments set forth herein; rather, these embodiments are provided so that this disclosure will be thorough and complete, and convey the scope of the invention to those skilled in the art.

DETAILED DESCRIPTION OF THE INVENTION

The use of "including," "comprising," "having," "containing," "involving," and/or variations thereof herein, is meant to encompass the items listed thereafter and equivalents thereof as well as additional items.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

Described herein are systems and methods for supplying a plurality of vessels. The invention may be embodied in a variety of ways.

Vessel supply systems capable of consistently supplying a large volume of sample vessels into a downstream process individually, with the vessel orientation aligned with the requirements of the downstream processes can greatly improve operating costs and efficiency. For example, samples that are used for research and/or analysis applications may be placed within vessels and sent to a testing facility for processing and analysis. Some of these facilities may receive tens of thousands of individual sample vessels daily. By using an automated sorting system in conjunction with an automated supply system, the sorting of the large number of vessels at a testing facility may be completed with greater speed and accuracy, thereby improving the efficiency and reliability of a testing facility while reducing operating cost. Other downstream processes may also benefit from a high speed system to supply vessels that have been sorted from a random mass, and have been individuated and realigned from a random orientation to the orientation required by the process.

In certain embodiments, the invention may comprise a system for supplying a plurality of vessels to a downstream process. A system for supplying a plurality of vessels may comprise a feeding unit configured to supply a plurality of vessels to at least one exit position. In some embodiments, the feeding unit may comprise a feed bin, at least one transporter, and at least one transfer belt. In some cases, the feed bin may be substantially trapezoidal in shape and comprise a bottom surface, a substantially open top, a front, a back, an A-side and a B-side. In some embodiments, the feed bin may be configured to feed each of the plurality of vessels from an entry position at the top of the feed bin to at least one edge position of the bottom surface. In certain embodiments, the at least one transporter may be positioned at least one of the A-side or the B-side of the feed bin. In an embodiment, the A-side and the B-side of the bin are on opposite sides of the bin. In some embodiments, the at least one transporter may be configured to receive each of the plurality of vessels from the at least one edge position and transport each of the vessels to the at least one transfer point. In some embodiments, the at least one transfer belt may be positioned at the exit of the at least one transporter and at or near the top of the bin. In some embodiments, the transfer belt may be configured to receive each of the plurality of vessels from at least one transfer point and individually transfer individual vessels from the at least one transfer point to a bin exit position within the system. In some embodiments, an operating path of the at least one transfer belt may be substantially perpendicular to a direction of advancement of the at least one transporter.

In some embodiments, the systems comprise a feed bin that is operable to receive a plurality of unsorted vessels. The feed bin may be large enough to hold vessels in the quantity shipped and received. In some embodiments, the feed bin may be configured to gravity-feed the vessels to the transporter, such as by having sloped sides and/or a non-flat bottom surface. In some cases, an operator or a robot may load the unsorted and unoriented vessels in the feed bin.

In some embodiments, the feed bin may comprise a substantially trapezoidal shape, with a smaller bottom surface than top.

In some embodiments, the feed bin may further comprise an interior slope due to the slope of the A-sides and B-sides configured to direct each of the vessels toward the bottom of the feed bin. In certain embodiments, the bottom of the feed bin may comprise a wedge configured to direct the plurality of vessels to the edge of the bottom of the bin and onto the at least one transporter. In some embodiments, the wedge may be located near the center of the bottom surface of the feed bin and may be configured to direct the plurality of vessels to both the A-side and B-side of the feed bin. In some embodiments, the distribution of the plurality of vessels may be substantially balanced, such that the feed bin directs approximately one-half of the plurality of vessels to the A-side of the feed bin. In certain embodiments, the feed bin may further comprise a front side and a rear side, wherein the feed bin is configured to receive the plurality of vessels for feeding at either the front side or the rear side. In some embodiments, the feed bin may further comprise at least one angled corner element positioned at the convergence of the A-sides and B-sides and the front and back sides of the feeder bin and having a slope 45 degrees or more from the vertical. In some embodiments, the system may comprise more than one feed bin.

The transporter may be configured to orient each of the plurality of vessels during transfer from the feeder bin to the transfer belt. In some embodiments, the transporter may be a staircase singulator or step feeder, although other transporters can be used. In certain embodiments, the at least one transporter may comprise a series of steps configured to individually transfer each of the plurality of vessels from one step to the next step in the series. In some embodiments, each step comprises a ledge and riser, wherein each riser may be configured to: (i) lift each of the plurality of vessels from the bottom edge surface of the bin to an elevation stage adjacent to the ledge of the next step of the at least one transporter; (ii) transfer each vessel to that ledge, and (iii) return back to the bottom surface of the bin. In certain embodiments, the height of the elevation stage is greater than the height of the ledge of the next step in the series. In some cases, the depth of the ledges of the steps are configured to decrease through the transporter, with the ledge of the lower step being deeper than the ledge of the upper step. Multiple vessels may become arranged on the lowest step in a random fashion and rise to the next ledge in the series of steps. As the depth decreases, only those vessels aligned with the ledge may proceed on the riser to the subsequent ledge in the series. Vessels not aligned, may tumble back into the feed bin among the plurality of vessels. The alignment and tumbling action aid in the random nature of the feed system described herein.

In some cases, the steps may be configured to align each of the plurality of vessels in a single file arrangement and/or in an end-to-end arrangement at the at least one transfer point. In some embodiments, each ledge and each riser are each configured to hold more than one vessel in a horizontal and longitudinally tandem fashion parallel to the A-sides and B-sides of the bin. In some embodiments, the ledge and the riser of each step may be configured to bevel away from the feed bin toward the back of the transporter to bias the vessel to stay on the ledge toward the back of the step. In some cases, the bevel angle is approximately 10 degrees. In other cases, the bevel angle may be 5 degrees, 15 degrees, 20 degrees, 25 degrees, or any degree between 5 and 25 degrees.

In some embodiments, each ledge and each riser may further comprise a wavy surface configured to align each of the plurality of vessels in a substantially horizontal orientation with the longitudinal axis of the vessel along the ledge or riser. In some cases, the wavy surface may have a sinusoidal shape. In some cases, the wavy surface may comprise a series of triangular shapes, sharp peaks, or rounded peaks. In some embodiments, the wavy surface may be configured to return each of the plurality of vessels not oriented in a substantially horizontal orientation back into the feeding bin. In certain embodiments, the series of steps are configured to operate together as a unit, rising and lowering at the same time. In some embodiments, the final step and exit of the at least one transporter is substantially aligned with the at least one transfer belt. In some cases, the surface of the ledge and riser comprises a plastic material. In some cases, the surface of the ledge and riser does not comprise a non-stick material or a fluorinated material.

In some embodiments, the transfer belt may be configured to seek a condition state of the downstream process or unit to determine an operating state. In particular, the transfer belt may confirm that the downstream unit is operating and request feedback. By checking the condition states within the system, the system may prevent bottlenecks and undesirable jams within the system. In some cases, the transfer belt may be called a second transfer belt, and may be operable to transfer each vessel to a first transfer belt of the downstream unit.

In some embodiments, the transfer belt comprises a rubberized material. In certain embodiments, the rubberized material of the transfer belt may comprise a plurality of raised elements configured to assist in the transfer of vessels. These raised elements may be configured perpendicular to the operating direction of the belt to bump each of the vessels and begin to move the vessels forward on the belt.

In some embodiments, the feed bin comprises a cover panel configured to provide access to the feeder bin. In one example, the cover panel may be easy to open, yet provide protection from dust and other substances and prevent foreign objects from entering the feed bin.

In certain embodiments, the feeding system may further comprise an inspection table or ledge adjacent to the feed bin. The inspection table may be configured to control at least part of the vessels that enter and exit the bin. For example, the inspection table may provide for the shipment of vessels to be evaluated for quality, contamination, and foreign objects prior to loading the plurality vessels into the feed bin. In some cases, the inspection table may be configured to permit removal of each vessel not meeting system requirements. The inspection table may also provide for the shipment of vessels to be evaluated for compatibility with the sorting system prior to loading the feed bin.

In some embodiments, the plurality of vessels may comprise a random orientation upon entry into the feed bin. In some embodiments, the feed system may comprise at least one transporters and at least one transfer belt. In certain embodiments, the feed system may comprise two transporter and two transfer belts, where one transporter and one transfer belt pair are associated with the A-side of the feed bin and the second transporter and second transfer belt pair are associated with the B-side of the feed bin.

In some cases, each the plurality of vessels includes more than one identifying indicia. In some cases, the system may be configured to feed the plurality of vessels in a random nature. By feeding the downstream processes randomly, the loading of a subsequent system being supplied may be better balanced. For example, if the downstream system sorted the vessels into groups, the system may become bottlenecked if the feed system fed a slug or group of vessels all designated to the same sort group at the same time.

In some embodiments, each of the plurality of vessels may comprise a biological sample. For example, the vessel may be a tube that is cylindrical in shape. Optionally, the sample tube may comprise a cap. As used herein, the term "biological sample" encompasses any sample obtained from a biological source. A biological sample can, by way of non-limiting example, include blood, amniotic fluid, sera, urine, feces, epidermal sample, skin sample, cheek swab, sperm, amniotic fluid, cultured cells, bone marrow sample and/or chorionic villi. Convenient biological samples may be obtained by, for example, scraping cells from the surface of the buccal cavity. The term biological sample encompasses samples that have been processed to release or otherwise make available a nucleic acid (e.g., cell free DNA or RNA) or protein for detection as described herein. The biological sample may be obtained from a stage of life such as a fetus, young adult, adult, and the like. The biological sample may be obtained from a non-human animal (e.g., cow, dog, cat), including veterinary samples. The biological sample may be obtained from an animal product (e.g., meat) or a plant product (e.g., crops such as corn and the like). Fixed or frozen tissues also may be used. Thus, a biological sample may be a sample or specimen taken from a living being, such as a human patient. In many cases the sample could be a tissue or fluid specimen, such as blood, plasma, or urine. The vessels, in addition to a biological sample, may further comprise various preservatives and anti-coagulants to preserve the sample during processing and testing time.

In some embodiments, each of the plurality of vessels may comprise an environmental sample. As used herein, the term "environmental sample" encompasses any sample obtained from an environmental source. An environmental sample can, by way of non-limiting example, include water (fresh, oceanic, or drinking), soil, plants, biological materials, and wastes (liquids, solids or sludge). In some embodiments, each of the plurality of vessels may be a geological sample container that is cylindrical in shape and comprises a cap. As used herein, the term "geological sample" encompasses any sample obtained from a geological source. A geological sample can, by way of non-limiting example, include rock, ore, minerals, and sediment. In some embodiments, each of the plurality of vessels may be a chemical or pharmaceutical sample container that is cylindrical in shape and comprises a cap. As used herein, the term "chemical sample" encompasses any sample obtained from a chemical or pharmaceutical source. A chemical sample can, by way of non-limiting example, include liquids, slurries, solids (powder, pellet, or cake), gels, tablets, and wastes. For example, vessels may be used to carry any suitable material, such as drugs used in screening applications, processing samples used to assess the conversion level, rocks or similar substances, and so on, and are not limited to carrying blood or other body or tissue samples.

As discussed herein, the vessel may be a tube that is cylindrical in shape along a longitudinal axis. Optionally, the tube may comprise a cap. The systems described herein may be configured to supply vessels having various shapes or dimensions. In some embodiments, each of the plurality of vessels may range in size from 75 millimeters (mm) to about 125 mm in length and about 8 to about 16 mm in diameter. For example, the vessel may be 8 mm, 10 mm, 12 mm, 14 mm, or 16 mm in diameter. For example, the vessel may be 75 mm, 80 mm, 90 mm, 100 mm, 110 mm, or 125 mm in length.

The system described herein may be modular in design. In some embodiments, the system may be configured to supply up to 4000 vessels per hour. In other embodiments, the system may be configured to supply up to 8000 vessels per hour. The system is designed to minimize human interaction during the supplying of the vessels.

In some embodiments, system may further comprise a shield configured to cover the system. In certain embodiments, the shield may be substantially transparent. In one example, the system has a cover, such as gull wing doors, that are easy to open, yet provide protection from dust or other substances and prevent foreign objects from entering the feed system. Optionally, the cover may provide visibility to the system when the cover is closed.

In some embodiments, the system may comprise a plurality of sensors that provide feedback to a central processing unit or monitoring system. In some examples, the sensors may provide feedback on the system status to an operator or downstream process. In some embodiments, the feeding system may comprise sensors related to the level in the feed bin, vessel motion on the transporter, and vessel motion on the transfer belt. The system may slow or stop portions of system or may reallocate assignments within the system based on the feedback received from the plurality of sensors.

Figure 1:
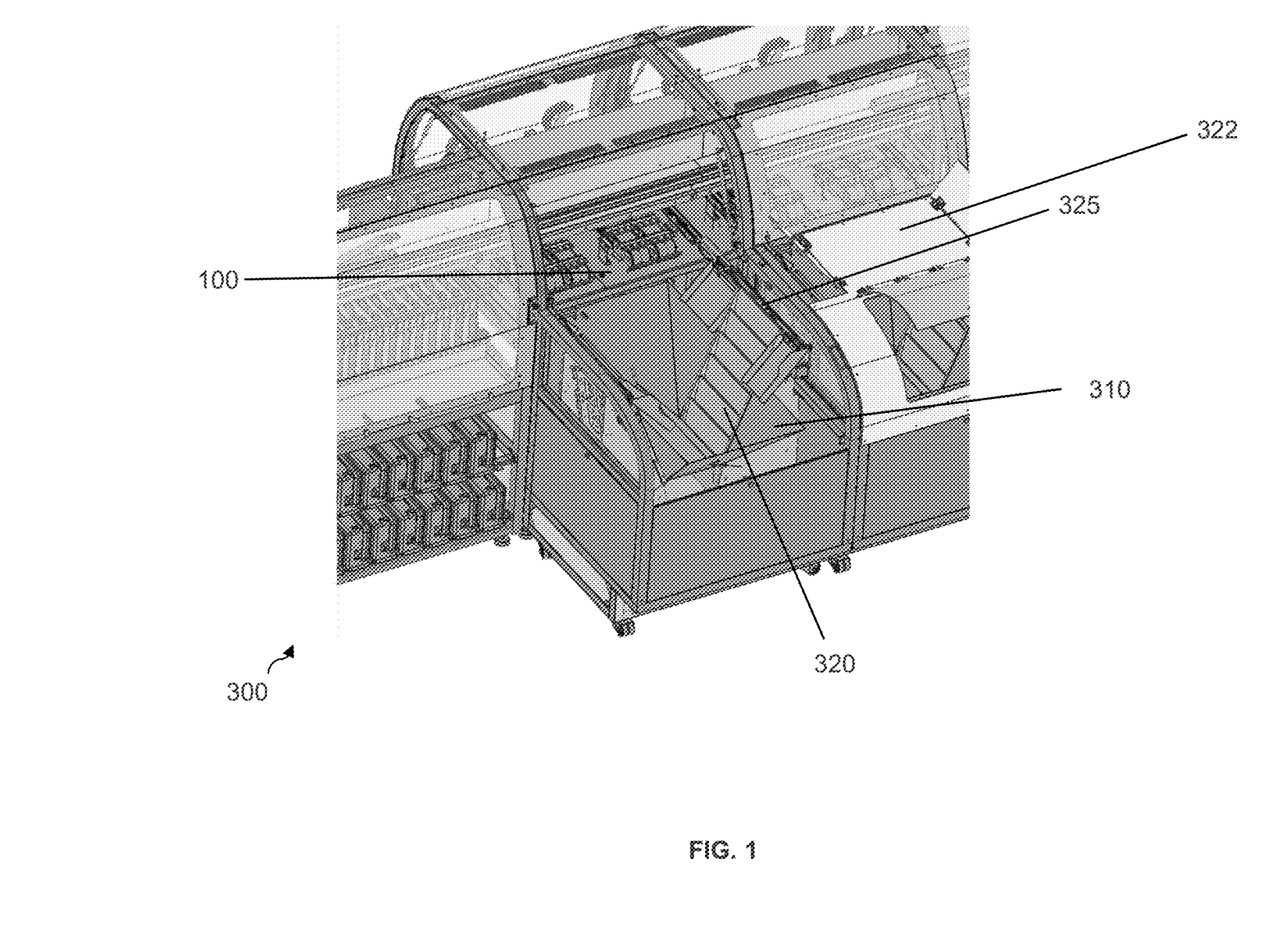
FIG. 1 is a perspective view of a vessel supply system in connection with a vessel sorting system according to one embodiment described herein.

Turning to the figures, FIG. 1 shows the feeding system 300. In some embodiments, a feeding system 300 comprises a feed bin 310, a transporter 320, and transfer belt 325. A plurality of unsorted, unoriented vessels may be loaded into feed bin 310. Individual vessels are transported from the feed bin 310 to the downstream process by the transporter 320. The transfer belt 325 transfers each vessel to a downstream unit 100. Also depicted in FIG. 1, the feeding system 300 may optionally be covered by cover panel 322.

Figure 2:
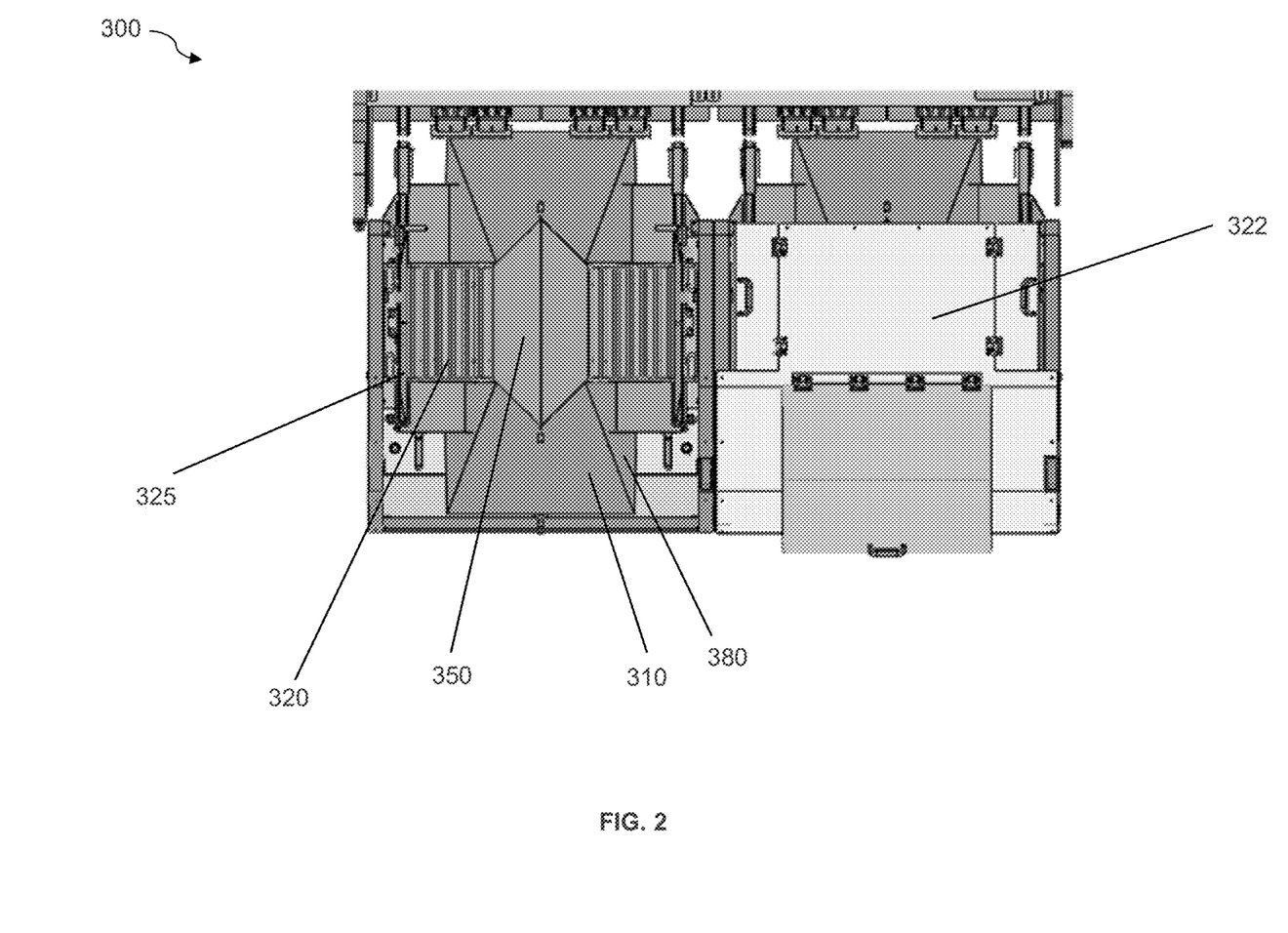
FIG. 2 is a top view of a vessel supply system according to one embodiment described herein.

FIG. 2 shows a top view of a feeding system 300. The feed bin 310 may include a wedge 350 to direct a plurality of vessels toward the at least one transporter 320. The angled corner element 380 directs vessels toward the base of the at least one transporter 320 and prevent vessels from accumulating in the corner of the feed bin 310. The transfer belt 325 is at the top edge of the feed bin and receives vessels from the transporter 320 and transfer the vessel to a downstream unit. The feeding system 300 may optionally be covered by cover panel 322. The cover panel 322 may comprise more than one hinged door to access areas of the feeding system 300.

Figure 3:
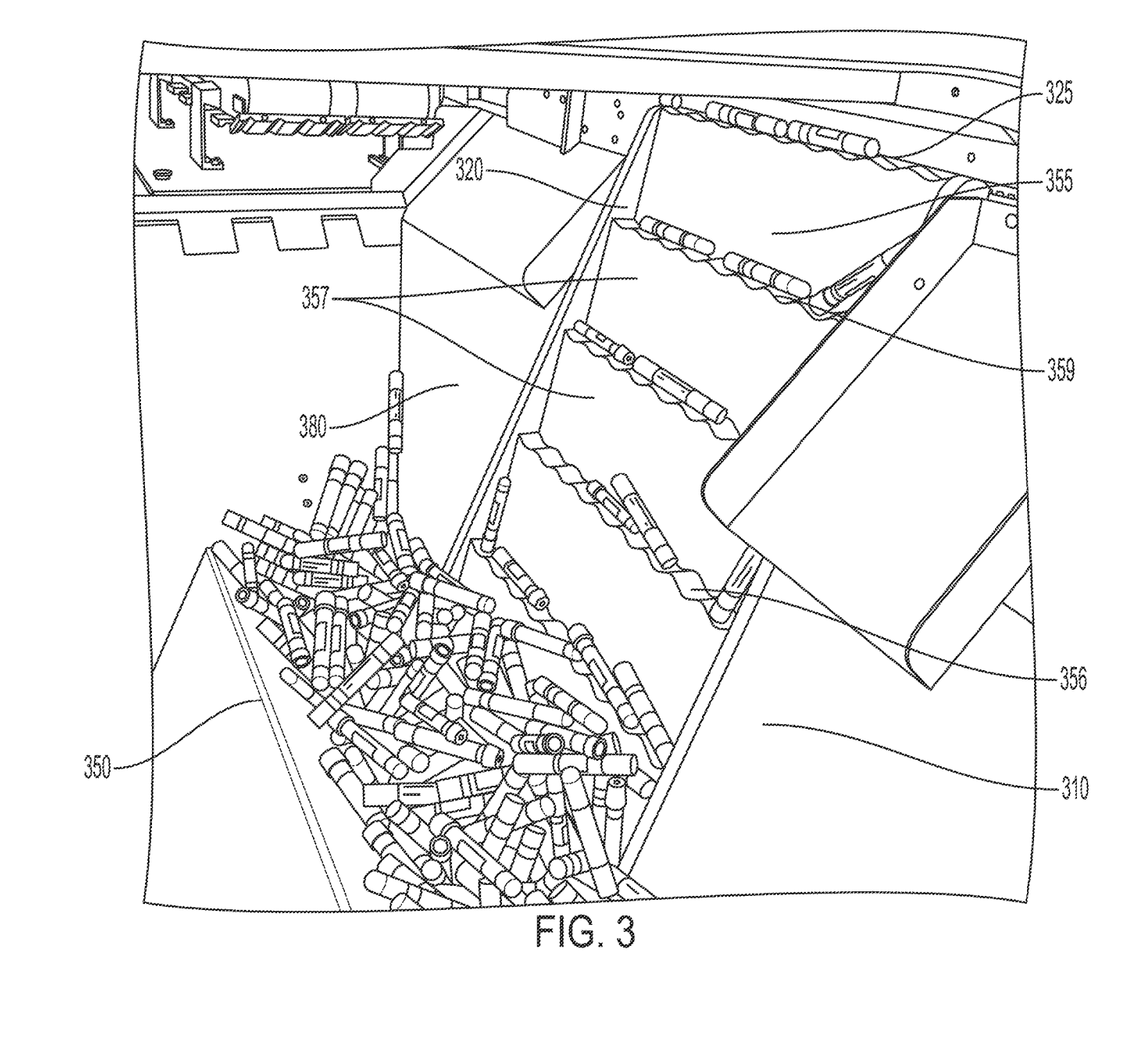
FIG. 3 shows a photograph of a vessel supply system according to one embodiment described herein.

FIG. 3 depicts one embodiment of the feed system described herein. As shown in FIG. 3, the feed bin 310 contains a plurality of vessels arranged in random orientations. The staircase transporter 355 picks up the vessels and transfer the vessels from step to step of the transporter 355 using risers 357 and ledge 356 to transport the aligned vessels to the top of the feeding system 300 where the vessels transition to the transfer belt 325. The vessels are oriented in a linear arrangement along the steps of the transporter; that orientation is maintained on the transfer belt 325. Also shown is wedge 350 that shunts the vessels placed in the bin in random orientations towards the transporter 320, or in embodiments with two transporters, shunts approximately half of the vessels towards the A-side and approximately half towards the B-side. Each ledge 356 may have a wavy surface 359 that orients each vessel into a horizontal orientation of the vessel's longitudinal axis as the vessel is transported from towards the transfer belt 325. Angled corner element 380 directs vessels that tumble from the transporter 320 back to the bottom of the feed bin 310 and prevents accumulation in the corners of the feed bin 310.

Figure 4:
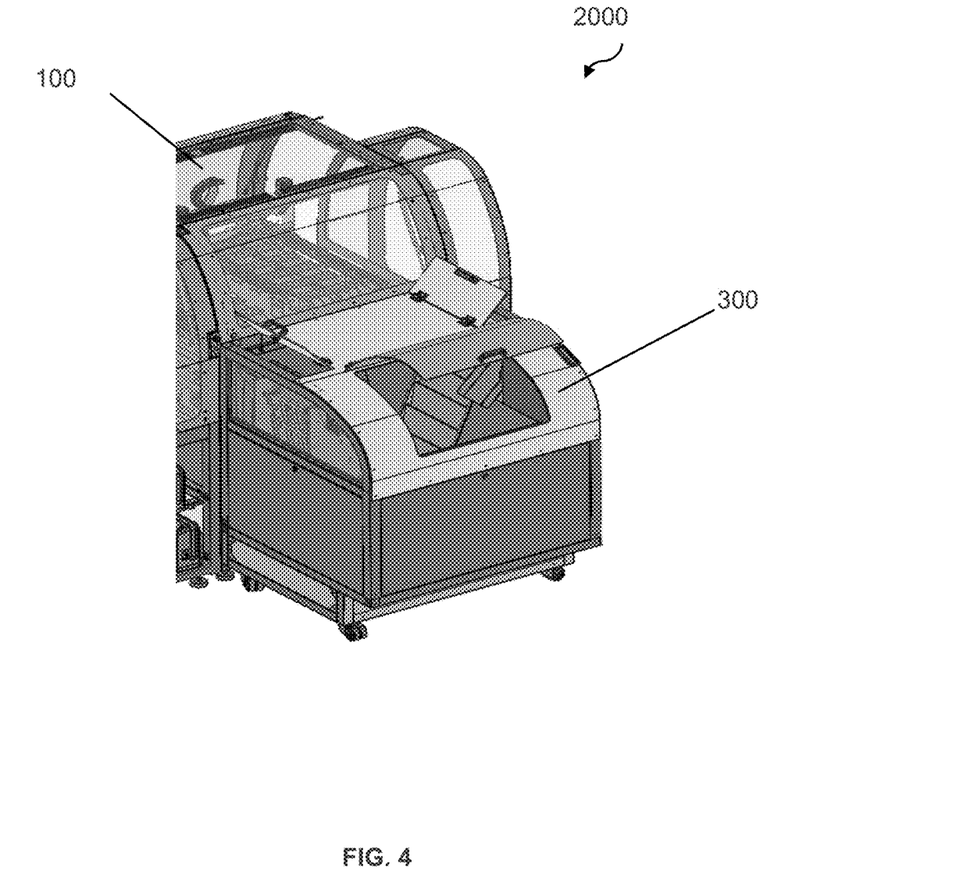
FIG. 4 shows a perspective view of a vessel supply system adjacent to downstream process according to one embodiment described herein.

FIG. 4 depicts one embodiment of a modular supplying system 2000 comprising one feeding system 300. The feeding system 300 is configured to supply each vessel to the front side of a downstream unit 100. The supply system in FIG. 4 is configured to sort up to 4,000 vessels per hour.

Figure 5:
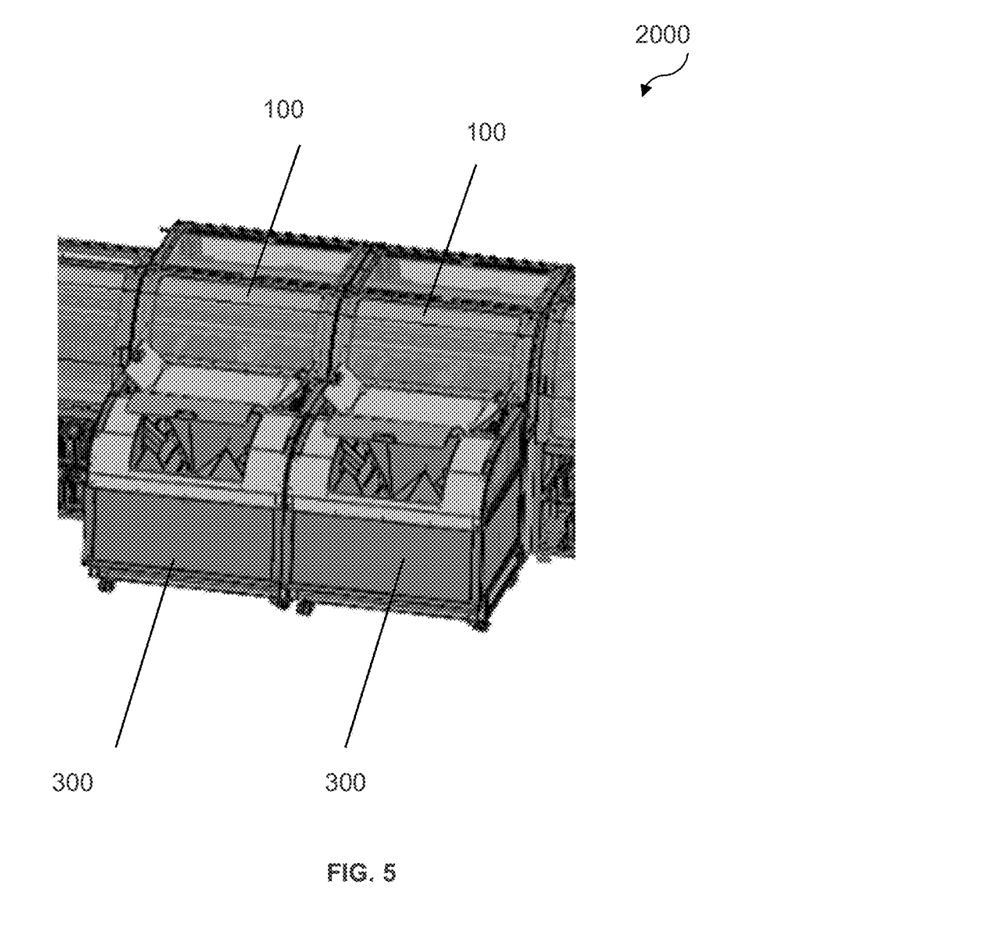
FIG. 5 shows a perspective view of a vessel supply system comprising two bins, four transporters, and four transfer belts, where the supply system is adjacent to downstream process according to one embodiment described herein.

FIG. 5 depicts one embodiment of a modular supplying system 2000 comprising two feeding systems 300. The feeding systems 300 are configured to supply vessels to the front side of the downstream units 100. The modular supplying system 2000 in FIG. 5 is configured to sort up to 8,000 vessels per hour.

Figure 6:
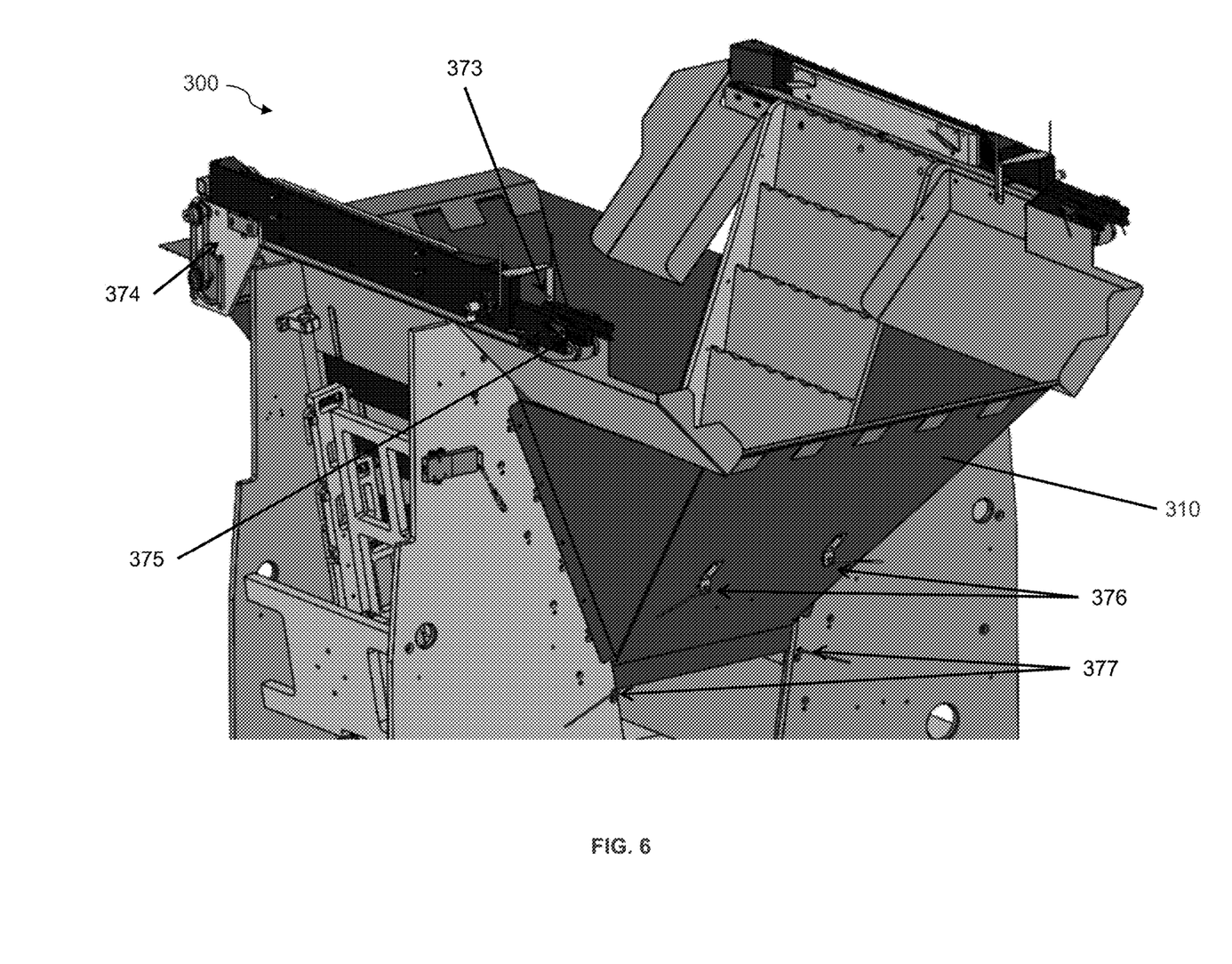
FIG. 6 shows feedback sensors on a feeder according to one embodiment described herein.

FIG. 6 shows feedback sensors on the feed bin 310 according to some embodiments. Feed level sensors 376 and 377 monitor the level of vessels in the feed bin 310 to identify low level or empty status of the feed bin 310 to an operator or monitoring system. Sensor 373 may monitor for jammed or error with the transfer belt. Sensor 374 may monitor motion of the transfer belt to ensure the transfer belt is engaged and running. Sensor 375 may monitor the transfer of each of the vessels from the feed system to a downstream process.

In some embodiments, the system has a throughput of more than 8,000 vessels per hour. In other embodiments, the system has a throughput of more than 1,000, more than 2,000, more than 3,000, more than 4,000, more than 5,000, more than 8,000, more than 10,000, more than 16,000, more than 20,000, or more than 30,000 vessels per hour. In some embodiments, the system has a throughput of 1,000 to 30,000 vessels per hour, 2,000 to 16,000 vessels per hour, or 3,000 to 8,000 vessels per hour.

Also described herein are methods for supplying a plurality of vessels. In some embodiments, a method for supplying a plurality of vessels may comprise providing a plurality of vessels, transferring the plurality of vessels to a feeding unit, and transferring the vessels via the at least one transfer belt to a downstream process or unit. In some embodiments, the feeding unit may be configured to supply a plurality of vessels to at least one exit position. In some embodiments, each of the plurality of vessels may be configured to hold a sample. In some embodiments, the feeding unit comprises: (i) a feed bin comprising a bottom surface, a substantially open top, a front, a back, an A-side and a B-side, and configured to feed each of the plurality of vessels from an entry position at the top of the feed bin to at least one edge position of the bottom surface; (ii) at least one transporter positioned on at least one of the A-side or the B-side of the feed bin and configured to receive each of the plurality of vessels from the at least one edge position and transport each of the vessels to the at least one transfer point; and (iii) at least one transfer belt positioned at the exit of the at least one transporter and at or near the top of the bin, and configured to receive each of the plurality of vessels from at least one transfer point and individually transfer individual vessels from the at least one transfer point to a bin exit position within the system. In some examples, the feed bin may be substantially trapezoidal in shape.

Illustrative Embodiments of Suitable Systems and Methods

As used below, any reference to methods, products, or systems is understood as a reference to each of those methods, products, or systems disjunctively (e.g., "Illustrative embodiment 1-4 is understood as illustrative embodiment 1, 2, 3, or 4.").

Illustrative embodiment 1 is a system for supplying a plurality of vessels, comprising: a feeding unit configured to supply a plurality of vessels to at least one exit position, wherein each of the plurality of vessels is configured to hold a sample, and wherein the feeding unit comprises: (i) a feed bin comprising a bottom surface, a substantially open top, a front side, a back side, an A-side, and a B-side, and configured to feed each of the plurality of vessels from an entry position at the top of the feed bin to at least one edge position of the bottom surface; (ii) at least one transporter positioned on at least one of the A-side or the B-side of the feed bin and configured to receive each of the plurality of vessels from the at least one edge position and transport each of the vessels to at least one transfer point.

Illustrative embodiment 2 is the system of any preceding or subsequent illustrative embodiment, wherein the feed bin is substantially trapezoidal in shape.

Illustrative embodiment 3 is the system of any preceding or subsequent illustrative embodiment, further comprising (iii) at least one transfer belt positioned at the exit of the at least one transporter and at or near the top of the feed bin, and configured to receive each of the plurality of vessels from at least one transfer point and individually transfer individual vessels from the at least one transfer point to a bin exit position within the system.

Illustrative embodiment 4 is the system of any preceding or subsequent illustrative embodiment, wherein the plurality of vessels comprise a biological sample tube that is cylindrical in shape and comprises a cap.

Illustrative embodiment 5 is the system of any preceding or subsequent illustrative embodiment, wherein each of the plurality of vessels ranges from 75 to about 125 mm in length and about 8 to about 16 mm in diameter.

Illustrative embodiment 6 is the system of any preceding or subsequent illustrative embodiment, wherein the at least one transfer belt comprises a rubberized material.

Illustrative embodiment 7 is the system of any preceding or subsequent illustrative embodiment, wherein the rubberized material comprises a plurality of raised elements configured to assist in the transfer of vessels.

Illustrative embodiment 8 is the system of any preceding or subsequent illustrative embodiment, wherein an operating path of the at least one transfer belt is substantially perpendicular to a direction of advancement of the at least one transporter.

Illustrative embodiment 9 is the system of any preceding or subsequent illustrative embodiment, wherein the feed bin is a trapezoidal shape wherein an area of the bottom surface is smaller than an area of the top of the feed bin.

Illustrative embodiment 10 is the system of any preceding or subsequent illustrative embodiment, wherein the feed bin further comprises an interior slope at the convergence of the A-side and B-side with the bottom surface of the feed bin, wherein the interior slope is configured to direct each of the vessels toward the transporter.

Illustrative embodiment 11 is the system of any preceding or subsequent illustrative embodiment, wherein the bottom surface of the feed bin comprises a wedge configured to direct the plurality of vessels to an edge of the bottom surface of the feed bin and onto the at least one transporter.

Illustrative embodiment 12 is the system of any preceding or subsequent illustrative embodiment, wherein the wedge is located near the center of the bottom surface of the feed bin and is configured to direct the plurality of vessels to both the A-side and B-side of the feed bin.

Illustrative embodiment 13 is the system of any preceding or subsequent illustrative embodiment, wherein a distribution of the plurality of vessels is substantially balanced, such that the feed bin directs approximately one-half of the plurality of vessels to the A-side of the feed bin and approximately one-half of the plurality of vessels to the B-side of the feed bin.

Illustrative embodiment 14 is the system of any preceding or subsequent illustrative embodiment, wherein the feed bin further comprises a front side and a rear side, wherein the feed bin is configured to receive the plurality of vessels for feeding at either the front side or the rear side.

Illustrative embodiment 15 is the system of any preceding or subsequent illustrative embodiment, wherein the feed bin further comprises at least one angled corner element positioned at a convergence of the A-side, B-side, a front side, and a back side of the feed bin, and the angled corner has a slope of at least 45 degrees relative to one of the A-side, B-side, front side, or back side.

Illustrative embodiment 16 is the system of any preceding or subsequent illustrative embodiment, wherein the at least one transporter comprises a series of steps configured to individually transfer each of the plurality of vessels from one step to the next step in the series.

Illustrative embodiment 17 is the system of any preceding or subsequent illustrative embodiment, wherein each step comprises a ledge and riser, wherein each riser is configured to: (i) lift each of the plurality of vessels from the bottom surface of the feed bin to an elevation stage adjacent to the ledge of the next step of the at least one transporter; (ii) transfer each vessel to that ledge, and (iii) return back to the bottom surface of the feed bin; and wherein a height of the elevation stage is greater than a height of the ledge of the next step the series.

Illustrative embodiment 18 is the system of any preceding or subsequent illustrative embodiment, wherein a depth of the ledges of the steps are configured to decrease through the transporter, with the ledge of a lower step being deeper than the ledge of an upper step.

Illustrative embodiment 19 is the system of any preceding or subsequent illustrative embodiment, wherein the steps are configured to align each of the plurality of vessels in a single file arrangement at the at least one transfer point.

Illustrative embodiment 20 is the system of any preceding or subsequent illustrative embodiment, wherein each ledge and each riser are each configured to hold more than one vessel in a horizontal and longitudinally tandem fashion parallel to the A-side and B-side of the feed bin.

Illustrative embodiment 21 is the system of any preceding or subsequent illustrative embodiment, wherein the ledge and the riser of each step are configured to bevel away from the feed bin toward the back of the transporter.

Illustrative embodiment 22 is the system of any preceding or subsequent illustrative embodiment, wherein an angle of the bevel is 5 to 15 degrees.

Illustrative embodiment 23 is the system of any preceding or subsequent illustrative embodiment, wherein each ledge and each riser further comprise a wavy surface configured to align each of the plurality of vessels in a substantially horizontal orientation with a longitudinal axis along the ledge or riser.

Illustrative embodiment 24 is the system of any preceding or subsequent illustrative embodiment, wherein the surface of the ledge and riser comprises a plastic material.

Illustrative embodiment 25 is the system of any preceding or subsequent illustrative embodiment, wherein the wavy surface is configured to return each of the plurality of vessels not oriented in a substantially horizontal orientation back into the feeding bin.

Illustrative embodiment 26 is the system of any preceding or subsequent illustrative embodiment, wherein the series of steps are configured to operate together as a unit, rising and lowering at the same time.

Illustrative embodiment 27 is the system of any preceding or subsequent illustrative embodiment, wherein a final step and exit of the at least one transporter is substantially aligned with the at least one transfer belt.

Illustrative embodiment 28 is the system of any preceding or subsequent illustrative embodiment, further comprising a cover panel configured to provide access to the feed bin.

Illustrative embodiment 29 is the system of any preceding or subsequent illustrative embodiment, further comprising an inspection table adjacent to the feed bin, wherein the inspection table is configured to control at least in part tubes that enter and exit the feed bin.

Illustrative embodiment 30 is the system of any preceding or subsequent illustrative embodiment, wherein the inspection table is configured to permit removal of each vessel not meeting system requirements.

Illustrative embodiment 31 is the system of any preceding or subsequent illustrative embodiment, wherein the plurality of vessels comprise a random orientation upon entry into the feed bin.

Illustrative embodiment 32 is the system of any preceding or subsequent illustrative embodiment, comprising two transporters and two transfer belts, wherein one transporter and transfer belt pair are associated with the A-side of the feed bin and the other transporter and transfer belt pair are associated with the B-side of the feed bin.

Illustrative embodiment 33 is the system of any preceding or subsequent illustrative embodiment, wherein each the plurality of vessels includes more than one identifying parameter and wherein the system is configured to feed the plurality of vessels in a random nature and balance a loading of a subsequent system being supplied.

Illustrative embodiment 34 is the system of any preceding or subsequent illustrative embodiment, wherein the system can supply up to 16,000 vessels per hour.

Illustrative embodiment 35 is a method for supplying a plurality of vessels, comprising: providing a plurality of vessels and transferring the plurality of vessels to a feeding unit.

Illustrative embodiment 36 is the method of any preceding or subsequent illustrative embodiment, wherein the feeding unit configured to: supply a plurality of vessels to at least one exit position, wherein each of the plurality of vessels is configured to hold a sample, and wherein the feeding unit comprises: (i) a feed bin, the feed bin being substantially trapezoidal in shape and comprising a bottom surface, a substantially open top, a front, a back, an A-side and a B-side, and configured to feed each of the plurality of vessels from an entry position at the top of the feed bin to at least one edge position of the bottom surface.

Illustrative embodiment 37 is the method of any preceding or subsequent illustrative embodiment, wherein the feed unit further comprises (ii) at least one transporter positioned on at least one of the A-side or the B-side of the feed bin and configured to receive each of the plurality of vessels from the at least one edge position and transport each of the vessels to the at least one transfer point.

Illustrative embodiment 38 is the method of any preceding or subsequent illustrative embodiment, wherein the feed unit further comprises (iii) at least one transfer belt positioned at the exit of the at least one transporter and at or near the top of the feed bin, and configured to receive each of the plurality of vessels from at least one transfer point and individually transfer individual vessels from the at least one transfer point to a bin exit position within the unit.

Illustrative embodiment 39 is the system of any preceding or subsequent illustrative embodiment, further comprising transferring the vessel via the at least one transfer belt to a downstream process or unit.

Illustrative embodiment 40 is a system for supplying a plurality of vessels, comprising: a feeding unit configured to supply a plurality of vessels to at least one exit position, wherein each of the plurality of vessels is configured to hold a sample, and wherein the feeding unit comprises: (i) a feed bin, the feed bin being substantially trapezoidal in shape and comprising a bottom surface, a substantially open top, a front side, a back side, an A-side, and a B-side, and configured to feed each of the plurality of vessels from an entry position at the top of the feed bin to at least one edge position of the bottom surface; (ii) at least one transporter positioned on at least one of the A-side or the B-side of the feed bin and configured to receive each of the plurality of vessels from the at least one edge position and transport each of the vessels to at least one transfer point; and (iii) at least one transfer belt positioned at the exit of the at least one transporter and at or near the top of the feed bin, and configured to receive each of the plurality of vessels from at least one transfer point and individually transfer individual vessels from the at least one transfer point to a bin exit position within the system.

Illustrative embodiment 41 is a method for supplying a plurality of vessels, comprising: providing a plurality of vessels; transferring the plurality of vessels to a feeding unit, the feeding unit configured to: supply a plurality of vessels to at least one exit position, wherein each of the plurality of vessels is configured to hold a sample, and wherein the feeding unit comprises: (i) a feed bin, the feed bin being substantially trapezoidal in shape and comprising a bottom surface, a substantially open top, a front, a back, an A-side and a B-side, and configured to feed each of the plurality of vessels from an entry position at the top of the feed bin to at least one edge position of the bottom surface; (ii) at least one transporter positioned on at least one of the A-side or the B-side of the feed bin and configured to receive each of the plurality of vessels from the at least one edge position and transport each of the vessels to the at least one transfer point; and (iii) at least one transfer belt positioned at the exit of the at least one transporter and at or near the top of the feed bin, and configured to receive each of the plurality of vessels from at least one transfer point and individually transfer individual vessels from the at least one transfer point to a bin exit position within the unit; and transferring the vessel via the at least one transfer belt to a downstream process or unit.

Having described several aspects of this invention, it should be appreciated that various alterations, modifications and improvements will occur to those of skill in the art. Such alterations, modifications and improvements are intended to be part of this disclosure and are intended to be within the spirit and scope of the invention. Thus, the description and drawings herein are intended to be illustrative, not limiting. The phraseology and terminology used herein is for the purpose of description and should not be regarded as limiting.

That which is claimed:

1. A system for supplying a plurality of vessels, comprising:
    a feeding unit configured to supply a plurality of vessels to at least one exit position, wherein each of the plurality of vessels is configured to hold a sample, and wherein the feeding unit comprises:
    (i) a feed bin comprising a bottom surface, a substantially open top, a front side, a back side, an A-side, and a B-side, and configured to feed each of the plurality of vessels from an entry position at the top of the feed bin to at least one edge position of the bottom surface of the feed bin;
    (ii) at least one transporter comprising a series of steps positioned on at least one of the A-side or the B-side of the feed bin and configured to receive each of the plurality of vessels from the at least one edge position of the feed bin and transport each of the vessels to at least one transfer point, wherein each step in the series of steps comprises a ledge and a riser configured to individually transfer each of the plurality of vessels from one step to the next step in the series, and wherein each ledge and each riser comprise a surface having the shape of a transverse wave comprising a plurality of peaks and troughs configured to align each of the plurality of vessels in a substantially horizontal orientation with a longitudinal axis of each of the plurality of vessels along the ledge or riser; and
    (iii) at least one transfer belt positioned at the exit of the at least one transporter and at or near the top of the feed bin, and configured to receive each of the plurality of vessels from at least one transfer point and transfer individual vessels from the at least one transfer point to a bin exit position within the system.

2. The system of claim 1, wherein the at least one transporter is configured to receive the plurality of vessels that each comprise a sample tube that is cylindrical in shape and comprises a cap.

3. The system of claim 2, wherein each of the plurality of vessels ranges from 75 to about 125 mm in length and about 8 to about 16 mm in diameter.

4. The system of claim 1, wherein an operating path of the at least one transfer belt is substantially perpendicular to a direction of advancement of the at least one transporter.

5. The system of claim 1, wherein the feed bin further comprises an interior slope at a convergence of the A-side and B-side with the bottom surface of the feed bin, wherein the interior slope is configured to direct each of the vessels toward the at least one transporter.

6. The system of claim 5, wherein the bottom surface of the feed bin comprises a wedge configured to direct the plurality of vessels to an edge of the bottom surface of the feed bin and onto the at least one transporter.

7. The system of claim 6, wherein the wedge is located near the center of the bottom surface of the feed bin and is configured to direct the plurality of vessels to both the A-side and B-side of the feed bin.

8. The system of claim 7, wherein a distribution of the plurality of vessels is substantially balanced, such that the feed bin directs approximately one-half of the plurality of vessels to the A-side of the feed bin and approximately one-half of the plurality of vessels to the B-side of the feed bin.

9. The system of claim 1, wherein the feed bin further comprises at least one angled corner element positioned in the feed bin at a convergence of the A-side and the front side, the B-side and the front side, the A-side and the back side, the B-side and the back side, or combinations thereof, and the angled corner has a slope of at least 45 degrees relative to one of the A-side, B-side, front side, or back side.

10. The system of claim 1, wherein each riser is configured to: (i) move back and forth between the next step in the series of steps to lift each of the plurality of vessels to an elevation stage adjacent to the ledge of the next step in the series of steps of the at least one transporter; and (ii) transfer each vessel to the ledge of the next step, wherein a height of the elevation stage is greater than a height of the ledge of the next step in the series.

11. The system of claim 10, wherein a depth of the ledges of the steps are configured to decrease through the at least one transporter, with the ledge of a lower step being deeper than the ledge of an upper step.

12. The system of claim 11, wherein the steps are configured to align each of the plurality of vessels in a single file arrangement at the at least one transfer point.

13. The system of claim 10, wherein each ledge and each riser are each configured to hold more than one vessel in a horizontal and longitudinally tandem fashion parallel to the A-side and B-side of the feed bin.

14. The system of claim 10, wherein the ledge and the riser of each step in the series of steps are configured to bevel away from the feed bin toward the back of the at least one transporter.

15. The system of claim 14, wherein an angle of the bevel is 5 to 15 degrees.

16. The system of claim 1, further comprising an inspection table adjacent to the feed bin, wherein the inspection table is configured to control at least part of the plurality of vessels that enter and exit the feed bin.

17. The system of claim 1, wherein each the plurality of vessels includes more than one identifying parameter and wherein the system is configured to feed the plurality of vessels in a random nature and balance a loading of a subsequent system being supplied.

18. A method for supplying a plurality of vessels, comprising:
providing a plurality of vessels;
transferring the plurality of vessels to a feeding unit, the feeding unit configured to:
supply a plurality of vessels to at least one exit position, wherein each of the plurality of vessels is configured to hold a sample, and wherein the feeding unit comprises:
(i) a feed bin, the feed bin being substantially trapezoidal in shape and comprising a bottom surface, a substantially open top, a front, a back, an A-side and a B-side, and configured to feed each of the plurality of vessels from an entry position at the top of the feed bin to at least one edge position of the bottom surface of the feed bin;
(ii) at least one transporter comprising a series of steps positioned on at least one of the A-side or the B-side of the feed bin and configured to receive each of the plurality of vessels from the at least one edge position of the feed bin and transport each of the vessels to the at least one transfer point, wherein each step in the series of steps comprises a ledge and a riser configured to individually transfer each of the plurality of vessels from one step to the next step in the series, and wherein each ledge and each riser comprise a surface having the shape of a transverse wave comprising a plurality of peaks and troughs configured to align each of the plurality of vessels in a substantially horizontal orientation with a longitudinal axis of each of the plurality of vessels along the ledge or riser; and
(iii) at least one transfer belt positioned at the exit of the at least one transporter and at or near the top of the feed bin, and configured to receive each of the plurality of vessels from at least one transfer point and transfer individual vessels from the at least one transfer point to a bin exit position within the unit; and
transferring each of the plurality of vessels via the at least one transfer belt to a downstream process or unit.

* * * * *